United States Patent [19]

Hirosawa

[11] Patent Number: 4,656,504
[45] Date of Patent: Apr. 7, 1987

[54] ALLOCATION OF RECORDING AREA ONTO PHOTOSENSITIVE FILM

[75] Inventor: Makoto Hirosawa, Kyoto, Japan

[73] Assignee: Dainippon Screen Mfg. Co., Ltd., Kyoto, Japan

[21] Appl. No.: 701,215

[22] Filed: Feb. 13, 1985

[30] Foreign Application Priority Data

Feb. 13, 1984 [JP] Japan .................................. 59-25853

[51] Int. Cl.$^4$ .............................................. H04N 1/23
[52] U.S. Cl. ..................................... 358/75; 358/280; 358/78
[58] Field of Search .................. 358/75, 280, 283, 76, 358/78

[56] References Cited

U.S. PATENT DOCUMENTS

| 4,338,636 | 7/1982 | Yamada et al. | 358/75 |
| 4,388,653 | 6/1983 | Yamada | 358/75 |
| 4,470,074 | 9/1984 | Yamada | 358/75 |

FOREIGN PATENT DOCUMENTS 2124055  2/1984  United Kingdom .................. 358/75

Primary Examiner—Michael A. Masinick
Assistant Examiner—Robert M. Bauer
Attorney, Agent, or Firm—Lowe, Price, Leblanc, Becker & Shur

[57] ABSTRACT

In allocating recording areas corresponding to a plurality of originals onto photosensitive films, at first the allocation state of previously allocated areas of a photosensitive film is displayed, and an operator establishes, near an ideal recording start point, an approximate recording start point of an area to be allocated. Then the approximate recording start point is moved to a conclusive (ideal) recording start point at predetermined distances from the hind edges of the previously allocated images in the main and the subscanning directions.

9 Claims, 16 Drawing Figures (a)

(b)

(a)

(b)

ALLOCATION OF RECORDING AREA ONTO PHOTOSENSITIVE FILM

FIELD OF THE INVENTION

The present invention relates to an allocation process for allocation of recording area onto a photosensitive film in reproducing images by means of an image reproducing system such as a color scanner, and more particularly, to a method and apparatus for efficiently allocating recording areas corresponding to color separations of a plurality of originals onto photosensitive films of large size according to predeterminative input by an operator.

BACKGROUND OF THE INVENTION

Conventionally, confirmation of the location of a recording point on a photosensitive film in reproducing images has been carried out by first detecting the position of a recording head from the recording start or stop point and then by indicationg the point by means of an external displaying device such as LEDs. However, the indication provides only the subscanning direction factor of the photosensitive film. In other words, such an indication is not capable of indentifying the main scanning direction factor.

Furthermore, in order to increase use efficiency of a color scanner and consequently to curtail the consumption of photosensitive films, U.S. patent application Ser. No. 337,448, now abandoned discloses a method, by which four color separations Y (Yellow), M (Magenta), C (Cyan) and K (Black) of each of a number of originals are recorded onto respective one-fourth areas of one track of a photosensitive film as shown in FIG. 9(a). Even in this case, confirmation of the recording point on the photosensitive film is carried out only by detecting the sub-scanning position of a recording head.

However recently it is desired to record the color separations Y, M, C and K of an original onto a photosensitive film sequentially in the main scanning direction as shown in FIG. 9(b)-I, in a matrix as shown in FIG. 9(b)-II, or sequentially in the sub-scanning direction as shown in FIG. 9(b)-III in order to make efficient use of a photosensitive film of large size.

This kind of recording cannot be achieved by means of said conventional method of detecting the position of the recording head only of the sub-scanning direction factor, because the method is incapable of confirming the unexposed area of the photosensitive film of the main scanning direction factor, which fact raises the possibility of multiple exposure.

Even in a color layout scanner which carries out practically all the processes of color separation, color correction, magnification conversion, tint laying, retouching, editing and so forth necessary for electronic color image reproduction, the positions at which color separations are to be recorded are determined by using a position designation means such as a digitizer and a display means such as a CRT display in the allocation process as well as in the present invention. However, in the conventional method it has not been suggested that four color separations of each of a plurality of originals may be recorded onto a photosensitive film of large size efficiently as disclosed in the present invention.

A photosensitive film of large size is also destined to carry a lot of color separations, therefore, efficiency of use of the photosensitive film cannot be increased without any precise allocation control.

In reflection to the above conventional problems, U.S. patent application Ser. No. 625,782 discloses a method by which data of scanning start and stop points of an original, and data of recording start and stop points of color separations, Y, M, C and K thereof, determined by an operator's designation by means of a digitizer and a CRT display monitor, are stored in an external memory such as a disk memory, and are successively called up to an internal memory of a CPU as well as to a magnification ratio setter to control a recording process.

The above-mentioned method is advanced in terms of making efficient use of a photosensitive film. However, since the recording start points are determined by human perception, the gap width between the designated area to be allocated and the adjacent previously allocated area tends to be too wide.

SUMMARY OF THE INVENTION

Accordingly, it is an object of the present invention to provide an improved method and apparatus for allocating recording areas corresponding to color separations of a plurality of originals onto a photosensitive film.

Another object of the present invention is to develop the method disclosed in U.S. patent application Ser. No. 625,782.

A further object of the present invention is automatically to move an approximate recording start point of an area to be allocated, as established by an operator, to an ideal recording start point.

A further object of the present invention is to provide a method and system requiring simpler operation for the allocation process.

Other objects will, in part, be obvious and will, in part, appear hereinafter.

The present invention accordingly comprises the several steps and the relation of one or more of such steps with respect to each of the others, and the apparatus embodying features of construction, combination of elements and arrangement of parts, which are adapted to effect such steps, all as exemplified in the following detailed disclosure, and the scope of the present invention will be indicated in the claims.

Briefly, in accordance with the present invention, at first the allocation state of allocated areas on a photosensitive film is displayed on a display monitor, then an operator refering to the monitor image, establishes an approximate recording start point of an area to which color separations are to be allocated by means of a digitizer. The approximate recording start point need not always agree with the conclusve recording start point obtained subsequently, but is required to be situated near the conclusive point.

The thus-input approximate recording start point data is applied to a computer, which computes the conclusive recording start point to be at a certain distance away from the hind edge of the previously allocated area of the main and the sub-scanning directions according to the input data. Subsequently, a new allocation state obtained from the above-mentioned processes is displayed on the display monitor and the computer becomes ready for processing the next area.

Data necessary for displaying the allocation state on the display monitor is stored in a corresponding film file, and a plurality of such film files are stored in a memory.

A film file comprises data descriptive of area numbers, recording start and stop points and so forth.

The memory also stores original files, each of which indicates films and areas onto which the color separations of a corresponding original are to be allocated, and the data is used, when an operator inputs an original number to be submitted to the allocation process from a number input means, whether there is an original corresponding to the input number.

A conclusive recording start point of the present area is obtained as follows. At first it is determined with regard to every allocated area, whether the Y direction, that is, the main scanning direction, value $Y_0$ of the input approximate recording start point, which is established by the operator, is between the Y direction values of the recording start point and whether the X direction, that is, the sub-scanning and the recording stop point direction value $X_0$ thereof is greater than the X direction value of the recording start point. When the X direction value of the recording stop point of the previous allocated area is found, a coordinate value corresponding to the gap width of the X direction is added to the above detected value to obtain the X direction value $X_s$ of the conclusive recording start point of the present area. Thereafter it is determined with regard to every allocated area whether the above value $X_s$ is smaller than the X direction value of the recording stop point of each of them, the coordinate value of a point obtained by summing up the value $X_s$ and the subscanning length of the present area is greater than the X direction value of the recording start point of each of them, and the Y direction value $Y_0$ of the established approximate point is greater than the Y direction value of the recording start point of each of them. When the Y direction value of the recording stop point of the previous allocated area is found, a coordinate value corresponding to the gap width of the Y direction is added to the above detected value to be the Y direction value $Y_s$ of the conclusive recording start point of the present area.

The thus-obtained data of the recording start point of the present area is put into the corresponding film file and the original file, while the allocation state of the present area is displayed on the display monitor according to the newly established recording start point data.

These steps and means allows an operator only to establish only an approximate recording start point of an area to be recorded in allocating areas.

The above and other objects and features of this invention can be appreciated more fully from the following detailed description when read with reference to the accompanying drawings.

DETAILED DESCRIPTION OF A PREFERRED EMBODIMENT OF THE INVENTION

Figure 1:
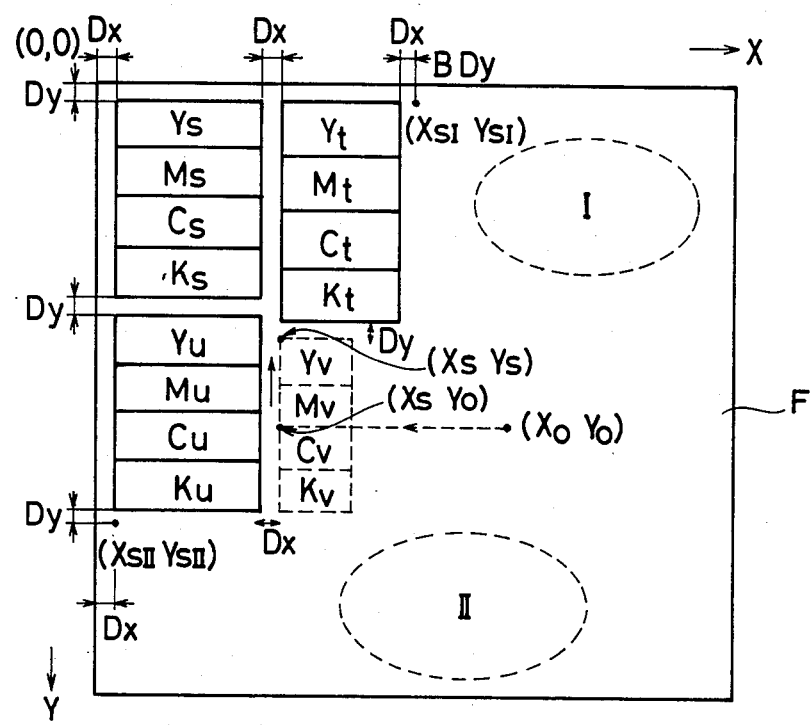
FIG. 1 shows the general concept of the present invention.

FIG. 1 shows the general concept of the present invention, wherein a photosensitive film on which color separations $Y_s$, $M_s$, $C_s$ and $K_s$ respectively corresponding to Yellow, Magenta, Cyan and Black of an original S, color separations $Y_t$, $M_t$, $C_t$ and $K_t$ of an original T, color separations $Y_u$, $M_u$, $C_u$ and $K_u$ of an original U are already allocated according to the following manner, and color separation images $Y_v$, $M_v$, $C_v$ and $K_v$ of an original V are now to be allocated, is shown on a CRT display monitor.

At first, an approximate recording start point ($X_0$, $Y_0$) of the image $Y_v$ is input to a control unit described to the sequel. The control circuit searches the X direction value of the hind edge of the allocated area on the line representative of the Y direction value $Y_0$, and adds a coordinate value corresponding to a gap width $D_x$ to the found value to obtain the X direction value $X_s$ of the conclusive recording start point. Then the control circuit searches the Y direction value of the hind edge of the allocated area on the line representative of the X direction value $X_s$, and adds a coordinate value corresponding to a gap width $D_y$ to the found value to obtain the Y direction value $Y_s$ of the conclusive recording start point. In the same manner, when an approximate recording start point is set up in an area I, a point ($X_{sI}$, $Y_{sI}$) becomes the conclusive recording start point, while when an approximate point is set up in an area II, a point ($X_{sII}$, $Y_{sII}$) becomes the conclusive recording start point.

Figure 2:
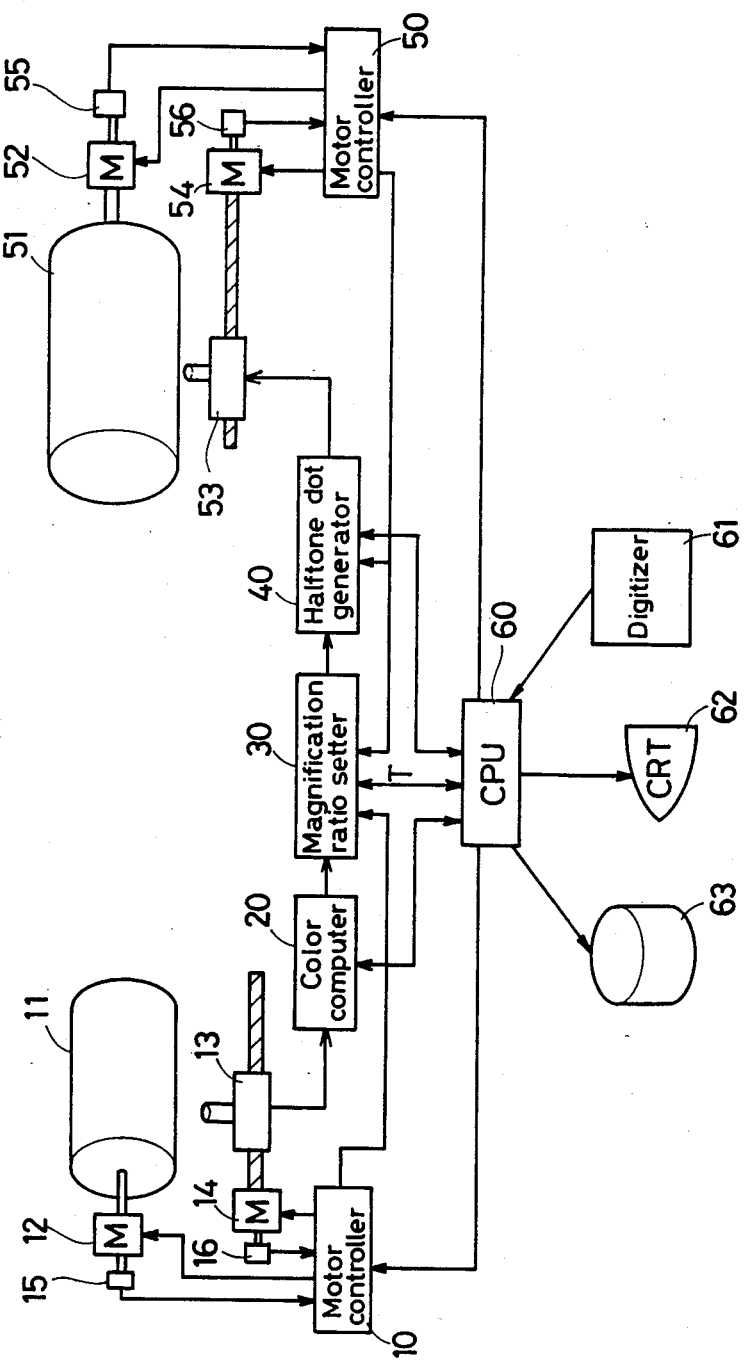
FIG. 2 shows a system for embodying the present invention.

FIG. 2 shows a block diagram of an image reproducing system of the present invention.

In FIG. 2, originals mounted on an input drum 11 revolved by a motor 12 are helically scanned by an input head 13 which is fed along a feed screw by a motor 14 at a speed corresponding to a magnification ratio in the sub-scanning direction.

The revolution speed of each of the motors 12 and 14 is controlled by a motor controller 10 responsive to command of a CPU 60. A rotary encoder 15 coaxially conneted to the motor 12 outputs a multiple pulse signal and a one revolution pulse signal to the motor controller 10, while a rotary encoder 16 coaxially connected to the motor 14 outputs another multiple pulse signal and another one revolution pulse signal to the motor controller 10. The motor controller 10 detects the position of the input head 13 according to the four signals provided by encoders 15 and 16. Then, position and magnification ratio data necessary for the scanning of the input head 13 are input from the CPU 60 to the motor controller 10, which controls the angular position and revolution speed of the motors according to the data.

Color component signals R (Red), G (Green) and B (Blue) of an original output from the input head 13 are applied to a color computer 20 to undergo processes of color correction, gradation correction, sharpness emphasis and so forth and then are put out as corresponding color separation signals Y, M, C and K.

The color separation signals Y, M, C and K from the color computer 20 are input to a magnification ratio setter 30, which converts the signals into signals corresponding to a desired magnification ratio of the main scanning direction factor and provides the converted signals to a halftone dot generator 40. Pertaining to the magnification ratio setter, for example, the devices disclosed in U.S. Pat. Nos. 3,272,918, 3,541,245, U.S. patent application Ser. Nos. 924,928, 933,714, both now abandoned, or Japanese Patent Laid Open No. 54-65601 can be adopted. Pertaining to the halftone dot generator, for example, the devices disclosed in U.S. Pat. No. 3,657,472, U.S. patent application Ser. No. 365,890, Japanese Patent Publication Nos. 53-5561, 52-33524 or Japanese Patent Laid Open No. 49-71811 can be adopted. Since these devices are not the subject of the present invention, no further descriptions of the same are given here.

On the other hand, a recording drum 51 is given a revolution power from a motor 52, while a recording head 52 which records reproduction images onto a photosensitive film is fed along a feed screw revolved by a motor 54 in the sub-scanning direction. Similarly to the input side, the revolution speed of each of the motors 52 and 54 are controlled by a motor controller 50. More specifically, rotary encoder 55 coaxially connected to the motor 52 of the recording drum outputs a multiple pulse signal and a one revolution pulse signal to the motor controller 50, while a rotary encoder 56 coaxially connected to the motor 54 to the feed screw outputs another multiple pulse signal and a one revolution pulse signal to the motor controller 50. The motor controller 50 detects the position of the recording head 53 according to the four signals provided by the two rotary encoders. Then, position and magnification ratio data necessary for the moving of the recording head 53 are input from the CPU 60 to the motor controller 50, which controls the angular position and revolution speed of the motors according to the data. The above-mentioned eight pulse signals indicative of the positions of the input head 13 and the recording head 53 are also applied to the magnification ratio setter 30 via respective motor controllers 10 and 50, while magnification ratio data of each original is input to the magnification ratio setter 30. By means of these motor controllers 10 and 50 and the magnification ratio setter 30, when reproducing images the input head 13 and the recording head 53 are moved to the scanning (recording) start point and fed to the sub-scanning direction according to the position and the magnification ratio data.

All the data requisite for the input scanning and recording processes are stored in an external memory 63 such as a disk memory. The data may be stored as an original file as shown in Table 1, and as a film file as shown in Table 2.

In Table 1, Original No. is the number for indentifying an original. Scanning start point $(x_a, y_a)$ and scanning stop point $(x_b, y_b)$ are respectively the coodinate values of the input scanning start and stop points on the original mounted on the input drum. The relation between the scanning start point $(x_a, y_a)$, the scanning stop point $(x_b, y_b)$, the magnification ratio (percentagewise) of the sub-scanning direction $M_X$, the magnification ratio (percentagewise) of the main scanning direction $M_Y$, the recording size of the sub-scanning direction $S_X$ and the recording size of the main scanning direction $S_Y$ can be expressed by equations:

$$\left. \begin{array}{l} S_X = (x_b - x_a) M_X/100 \\ S_Y = (y_b - y_a) M_Y/100 \end{array} \right\} \quad (1)$$

Figure 3:
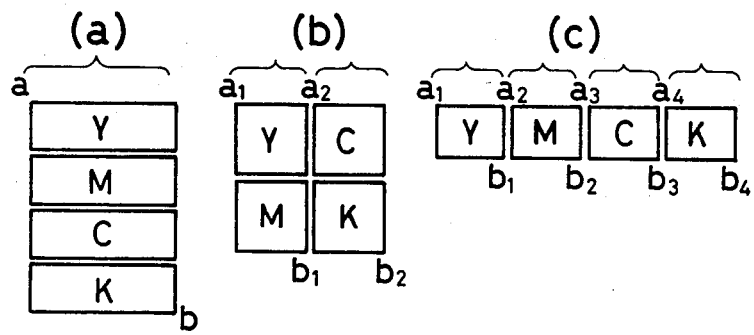
FIG. 3, comprising parts (a), (b), and (c), shows arrangement examples of color separation images of the present invention.

Film Nos. $Y_F$, $M_F$, $C_F$ and $K_F$ are the numbers of the films onto which the color separations Y, M, C and K of the original are to be allocated respectively in the following manner. Area Nos. $Y_A$, $M_A$, $C_A$ and $K_A$ are the numbers of areas of the respective films onto which the color separation images are to be recorded. FIG. 3 shows examples of arrangements of four color separations Y, M, C and K of an original onto a film in a group, in which FIG. 3(a) shows a sequential arrangement in the main scanning direction, FIG. 3(b) shows a matrix arrangement, and FIG. 3(c) shows a sequential arrangement in the sub-scanning direction. The above area numbers are given to each of the areas specified by the recording start and stop points. Since the exemplary arrangement of FIG. 3(a) can be recorded at one time, in other words, it comprises one recording start point $(X_a, Y_a)$ and one recording stop point $(X_b, Y_b)$ the four color separations Y, M, C and K are given a single area number. The arrangement example of FIG. 3(b) can be recorded in two times. In other words, the arrangement comprises two recording start points $(X_{a1}, X_{a1})$ and $(X_{a2}, Y_{a2})$, and two recording stop points $(X_{b1}, Y_{b1})$ and $(X_{b2}, Y_{b2})$, respectively. Therefore, the four color separations Y, M, C and K are given two area numbers. Meanwhile, the example of FIG. 3(c) can only be recorded in four times, in other words, it comprises four recording start points $(X_{a1}, Y_{a1})$, $(X_{a2}, Y_{a2})$, $(X_{a3}, Y_{a3})$ and $(X_{a4}, Y_{a4})$ and four recording stop points $(X_{b1}, Y_{b1})$, $(X_{b2}, Y_{b2})$, $(X_{b3}, Y_{b3})$ and $(X_{b4}, Y_{b4})$, therefore, the four color separations Y, M, C and K are given four area numbers. According to the above theory, for example, when three color separations Y, M and C are to be recorded together in the main scanning direction and a color separation K is to be recorded alone, one area number is given to the former group and another area number is given to the latter. As is obvious from the above description, each of the color separations Y, M, C and K can be allocated to any portion of any film alone or in combination.

In Table 2, Film No. is the number for identifying a film. Film sizes $F_x$ and $F_y$ are the sizes of the film of the sub-scanning and the main directions respectively. Area data comprises the following factors.

Area number i (i: 1, 2 ... N): a number to be given to the areas of the film on which reproduction images (color separations) of originals are to be allocated, which also corresponds to Area number $Y_A$, $M_A$, $C_A$ or $K_A$ of the original file.

Recording flag $A_{E(i)}$: a flag for indicating whether the area (i) is already recorded ("1") or not recorded ("0").

Area occupation flag $A_{f(i)}$: a flag for indicating whether the area (i) is already occupied by a reproduction (color separation) image of a specific original being allocated ("1") or is not so occupied ("0").

Allocated original number $A_{No(i)}$: the number of the original of which reproduction (color separation) image(s) is(are) allocated to the area (i).

The number of the allocated images $A_{c(i)}$: the number of the reproduction (color separation) images in the main scanning (Y) direction allocated for recording onto the area (i). For example, the numbers corresponding to the examples of FIG. 3(a), FIG. 3(b) and FIG. 3(c) are 4, 2 and 1, respectively.

$A_{xa(i)}$, $A_{ya(i)}$: the recording start point of the area (i).

$A_{xb(i)}$, $A_{yb(i)}$: the recording stop point of the area (i).

The above-mentioned two files of Tables 1 and 2 are formed in the following manner.

At first when an operator inputs an original number, the CPU 60 outputs a corresponding original file to a main memory (not shown) of the CPU (called a "CPU memory" hereinafter) as well as to a display monitor 62 to display the file. Then an operator manually moves the input head 13 to a scanning start point $(x_a, y_a)$ and further to a scanning stop point $(x_b, y_b)$ of the original mounted on the input drum 11 to input the coordinate values of both points to the CPU 60 according to a manner as disclosed in U.S. Pat. No. 4,573,666. The operator further inputs to the CPU 60 the magnification ratios $M_x$ and $M_y$. The CPU 60 computes the output sizes $S_x$ and $S_y$ by substituting the above found values for the corresponding terms of the equations (1). Conversely, by inputting the output sizes $S_X$ and $S_Y$ from a keyboard (not shown) and a digitizer 61 to the CPU 60, the magnification ratios $M_x$ and $M_y$ can be obtained. After being received with the color separation condition data, the original file is stored into the external memory 63. The other original files are provided using the same data input process.

Figure 4A:
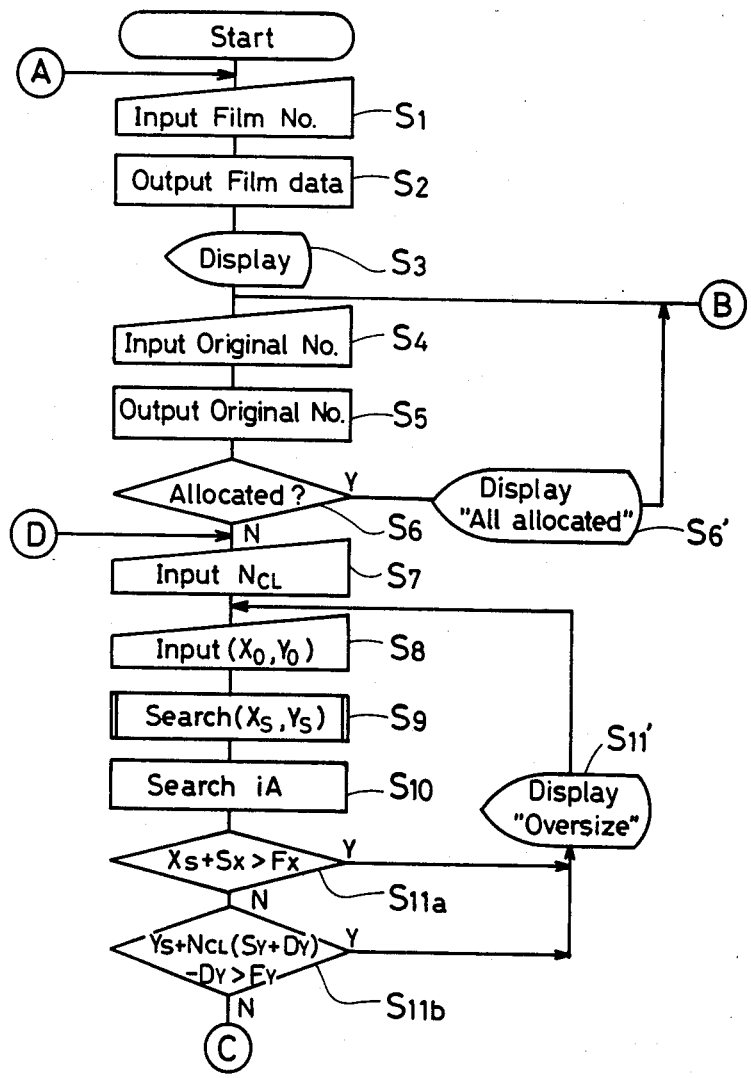
FIGS. 4a, 4b show a flow chart of the operation of the system shown in FIG. 2.

In the above process, data representative of the film and area numbers corresponding to the items 5 to 8 of Table 1 are not input to the original file. Then the CPU 60 allocates in the following manner areas to which color separations of a specific original are recorded onto a corresponding photosensitive film. That is, in FIG. 4, at step $S_1$ an operator inputs the number of a film to be processed from the keyboard. In response, the CPU 60 calls up to the CPU memory a corresponding film file as shown in Table 2 from the memory 63, as shown at step $S_2$. At the same time, at step $S_3$ the state of the allocation is displayed on the display monitor 62 according to the film size data $F_X$ and $F_Y$ and the area data.

When an operator inputs to the CPU 60 by means of the keyboard the number of an original to be allocated onto the film (step $S_4$), the CPU 60 calls up the film data of the original number to the CPU memory. Then it is determined at step $S_6$ whether the original identified by the number is already allocated. This determination is performed by inspecting whether at least one of the film numbers $Y_F$, $M_F$, $C_F$ and $K_F$ indicate 0(s) (not allocated) or all of them indicate a numeral other than 0 (allocated). When the result of Step $S_6$ is "Y", an "all allocated" sign is displayed on the display monitor at step $S_6'$.

When the result of the Step $S_6$ is "N", the number of the color separation images to be allocated serially in the main scanning direction $N_{CL}$ is input from the keyboard. In other words, it is determined at step $S_7$ which of the allocation modes of FIG. 3 is selected. When an operator inputs the coordinate value $(X_0, Y_0)$ of an approximate point by means of a digitizer 61 (Step $S_8$), the CPU 60 searches the most appropriate recording start point $(X_s, Y_s)$ (Step $S_9$). After finding the coordinate value $(X_s, Y_s)$ of the recording start point, at step $S_{10}$ the CPU 60 searches the area iA next to the area "i", namely, the youngest number of the unoccupied area. Then the sub-scanning direction value $X_s$ and main scanning direction value $Y_s$ of the recording start point of the area are respectively added to the sub-scanning length $S_x$ and the main scanning length $N_{CL}(S_y+D_y)-D_y$, where $D_y$ is the length of a gap between adjacent color separation images in the Y direction, and at steps $S_{11a}$, $S_{11b}$ are respectively compared with the length of the sub-scanning direction $F_X$ and the length of the main scanning direction $F_Y$ of a film. When each of the obtained values becomes greater than the corresponding one of the values $F_x$ and $F_y$, an "Oversize" sign is displayed at step $S_{11'}$, and the operation of the CPU 60 returns to the step $S_8$. Therefore, in this case an operator must establish another approximate recording start point to allocate the area corresponding to the color separation images onto another area of the photosensitive film.

Figure 4B:
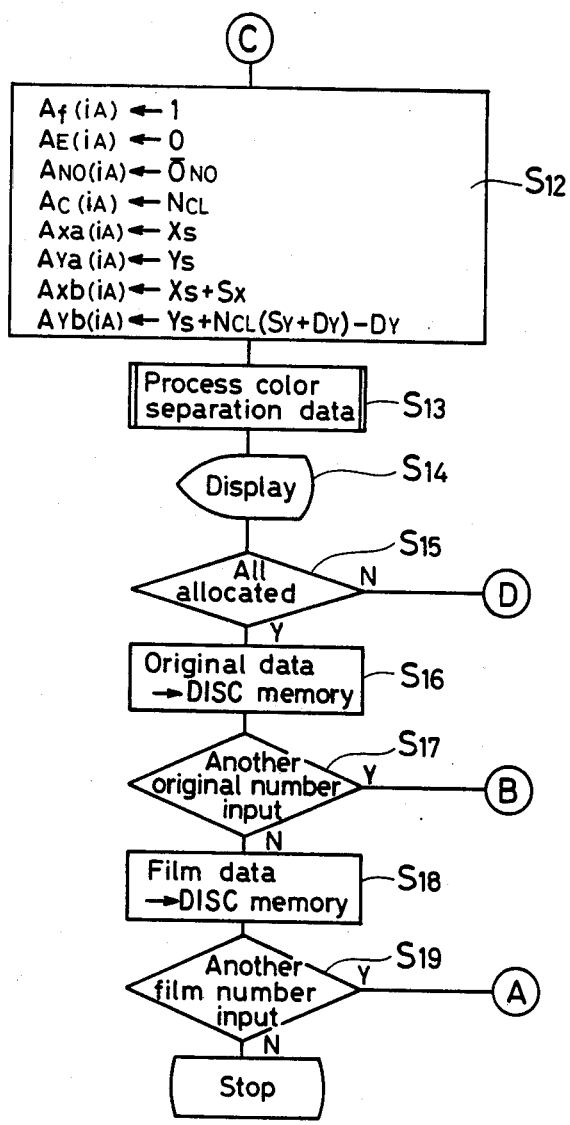

If the obtained values are smaller than the values $F_X$ and $F_Y$, the images are allocated to the designated area, and Exposure flag $A_E(iA)$ is reset to "0" (unexposed), Area occupation flag $A_f(iA)$ is reset to "1" (occupied), Original No is made to equal $A_{No}(iA)$ input to the step $S_4$, while the number of the allocated images $A_C$ (i) is made to be $A_c(iA)$ input in the step $S_7$. Furthermore, the values $X_S$, $Y_S$, $X_S+S_X$, and $Y_S+N_{CL}(S_Y+D_y)-D_y$ obtained in the step $S_9$ are set at step $S_{12}$ to be the X direction recording start point $A_{Xa}(iA)$, the Y direction recording start point $A_{Ya}(iA)$, the X direction recording stop point $A_{Xb}(iA)$, and the Y direction recording stop point $A_{Yb}(iA)$, as seen in FIG. 4b.

After completing the above processes, the terms (5) to (8) of table 1 are obtained at step $S_{13}$.

Then the state of the allocation of the color separations of the original is displayed on the display monitor, at step $S_{14}$. The CPU 60 determines whether all the color separations are already allocated by refering to the film numbers $Y_F$, $M_F$, $C_F$ and $K_F$ at step $S_{15}$. When there remain unlocated color separations, the result of step $S_{15}$ is negative, causing the CPU 60 to return to the step $S_7$ to complete the allocation process. When all the color separation images are allocated, step $S_{15}$ provides an affirmative result and the data of the originals produced in step $S_{13}$ is saved at step $S_{16}$ into the memory 63.

Thereafter, the CPU 60 determines at step $S_{17}$ whether other originals remaine to be processed. When the determination is affirmative, the operation of the CPU 60 returns to step $S_4$ to be ready for recieving an input by an operator of the next original number. When the result of step $S_{17}$ is negative, in other words, the allocation process for all the originals is completed, step $S_{17}$ is exited negatively and, at step $S_{18}$, the data obtained in the step $S_{12}$ is saved into the film file of the memory 63.

After that the CPU 60 further determines at step $S_{19}$ whether other films remain to be processed. When the result is affirmative, the operation returns CPU 60 to step $S_1$ to be ready for receiving an input by an operator of the next film number. When the result of $S_{19}$ is negative, in other words, the process for all the films is completed, the operation is stopped.

FIG. 5 shows a detailed flow chart of the step $S_9$ for searching the coordinate value $(X_S, Y_S)$ of the recording start point.

Figure 5A:
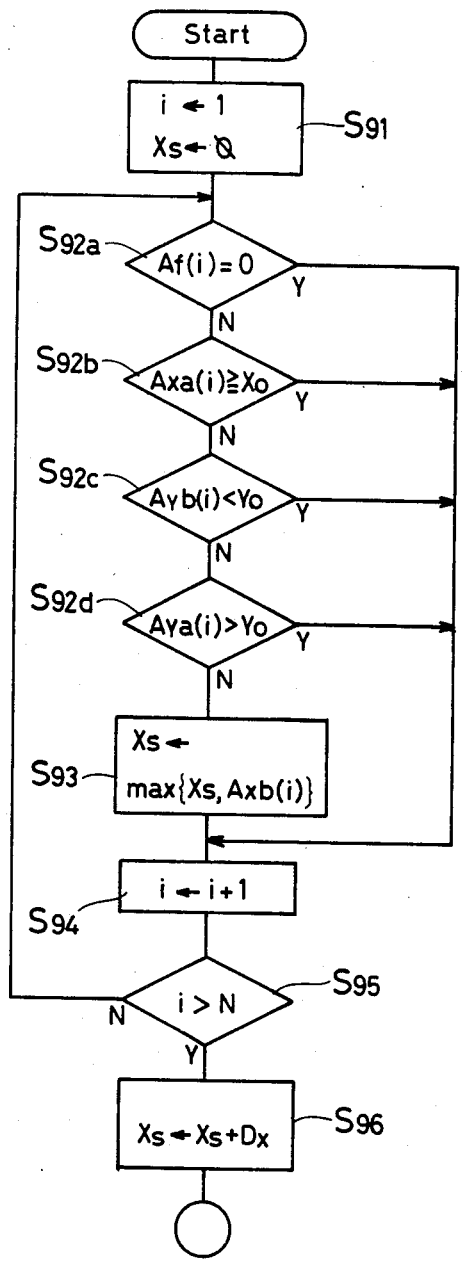
FIGS. 5a, 5b show a detailed flow chart of an image allocation step.
Figure 5B:
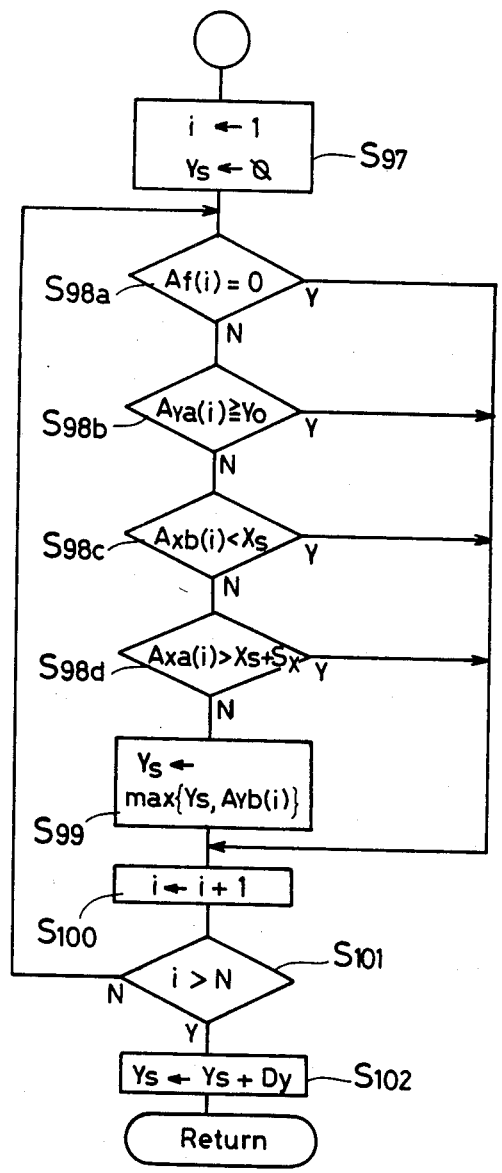

Summarizing the flow chart, in steps $S_{91}$ to $S_{96}$ shown in FIG. 5(a) the sub-scanning direction value $X_S$ of the recording start point of a color separation image is obtained, while in steps $S_{97}$ to $S_{102}$ shown in FIG. 5(b) the main scanning direction value $Y_S$ of the same point is obtained. The steps shown in the figures can be understood with reference to the illustration of FIG. 10.

In the flow chart of FIG. 5(a), at first the area number (i) and the sub-scanning direction value $X_S$ are made to be "1" and "0" respectively. Then it is determined at step $S_{92a}$ whether or not Area 1 is already used (occupied by another recording area), in other words whether the flag $A_{f(1)}$ is "1" or "0", respectively. When Area 1 is used, it is determined at step $S_{92b}$ whether the sub-scanning direction value $X_0$ of the approximate recording start point input in the step $S_8$ is greater than that $A_{Xa(1)}$ of the recording start point of Area 1. When $A_{Xa(1)} < X_0$, it is determined at step $S_{92c}$ whether the main scanning direction value $Y_0$ of the approximate recording start point is greater than that $A_{Yb(1)}$ of the recording stop point of Area 1. When $A_{Yb(1)} > Y_0$, it is determined at step $S_{92d}$ whether the Y direction value $Y_0$ is greater than that $A_{Ya(1)}$ of the recording start point of Area 1. When $A_{Ya(1)} < Y_0$, the largest value of $X_s$ which was set to "0" at the step $S_{91}$; input in the step $S_{91}$ and the sub-scanning direction value $A_{Xb}(1)$ of the recording stop point of Area 1 is adopted as the sub-scanning direction value of the actual recording start point. These steps $S_{92a}$ to $S_{92d}$ eventually determine whether the sub-scanning direction value $X_0$ of the approximate point set up in the step $S_8$ is located inside a hatched area shown in FIG. 10(a). When the result of any of the steps $S_{92a}$ to $S_{92d}$ is "YES", the area number (i) is advanced by one (in this case, the area number (i) is set equal to "2") at step $S_{94}$, and is then compared at step $S_{95}$ with the largest allocated area number N. When i<N, the result means that there are other areas to be processed in accordance with steps $S_{92a}$ to $S_{92d}$. Therefore, the processes are carried out on the remaining areas in order, beginning with the next area (in this case, Area 2).

Figure 10:
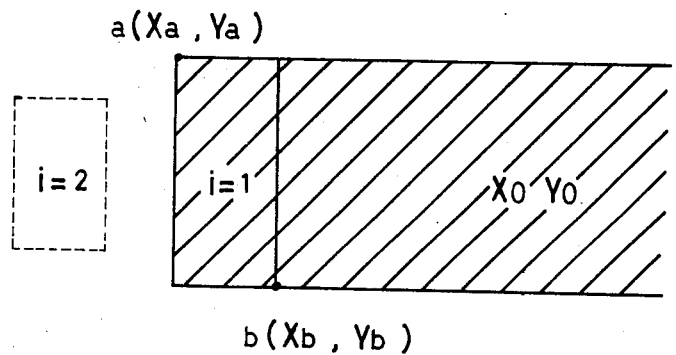
FIGS. 10a, 10b show a recording start point searching process of the present invention.
Figure 10:
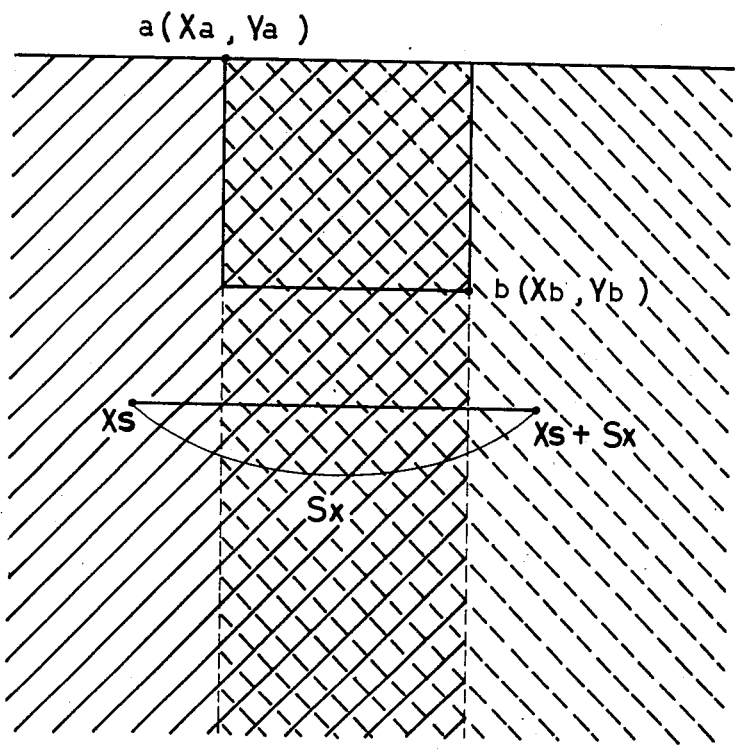

The reason why the step $S_{93}$ is necessary, that is, the reason why the largest value of the already determined value $X_S$ and the sub-scanning direction value $A_{XB(i)}$ of the recording stop point of the present area have to be selected in the step $S_{93}$ is that the value $A_{XB(i)}$ is not always greater than the value $X_S$, as shown in FIG. 10. The process of the step $S_{93}$ is of course not carried out when the result of at least one of the steps $S_{92a}$ to $S_{92d}$ is "YES".

When the area occupation flag $A_{f(i)}$ is "$A_{f(i)}=0$" in the step $S_{92a}$ - - - ($S_{92}$: YES), since the result means no areas are to be allocated to the area designated by the number (i), the operation of the CPU 60 skips the steps $S_{92a}$ to $S_{93}$ to proceed directly to the step $S_{94}$. The operation of the CPU 60 also proceeds to the step $S_{94}$ when it is ascertained that the approximate recording start point ($X_0$, $Y_0$) doesn't exist inside the hatched area shown in FIG. 10(a).

After the above-mentioned processes, a conclusive sub-scanning direction value $X_S$ is determined at step $S_{96}$ by summing up the determined value $X_S$ and a coordinate value corresponding to the gap width $D_X$.

In the flow chart of FIG. 5(b), at first the area number (i) and the main scanning coordinate value $Y_S$ are made to be "1" and "0" respectively. Then it is determined at step $S_{98}$ whether Area 1 is already used (occupied by another recording area). When Area 1 is used, it is determined at step $S_{98b}$ whether the main scanning coordinate value $Y_0$ of the approproximate recording start point input in the step $S_8$ is greater than that $A_{Ya(1)}$ of the recording start point of Area 1. When $A_{Ya(1)} < Y_0$, it is determined at step $S_{98c}$ whether the sub-scanning direction value $A_{Xb(1)}$ of the recording stop point of Area 1 is greater than that $X_S$ obtained in the step $S_{96}$.

When $A_{Xb(1)} \geq X_S$, it is determined at step $S_{98d}$ whether the sub-scanning coordinate value $A_{Xa(1)}$ of the recording start point of Area 1 is greater than the value $X_s + S_x$. When $A_{Xa(1)} \leq X_s + S_x$, the larger of the valves $Y_s$ set up in the step $S_{97}$ and the value $A_{Yb(1)}$ is adopted at step $S_{99}$ as the main scanning direction value of the determained recording start point. These steps $S_{98b}$ to $S_{98d}$ specify the sub-scanning direction value of the recording start point of the present area. After that the area number is advanced by one at step $S_{100}$, it is determined at step $S_{101}$ whether the renewed number exceeds the largest area number N - - - ($S_{101}$). When i≦N, the steps $S_{98a}$ to $S_{100}$ are carried out on the remaining areas.

When at least one of the results of the steps $S_{98a}$ to $S_{98d}$ is "YES", of course the process of the step $S_{99}$ is not carried out.

In that event, the main scanning coordinate value $Y_s$ of a conclusive recording start point is obtained at step $S_{102}$ by summing up the determained value $Y_s$ and the coordinate value corresponding to the gap width $D_y$.

Figure 6:
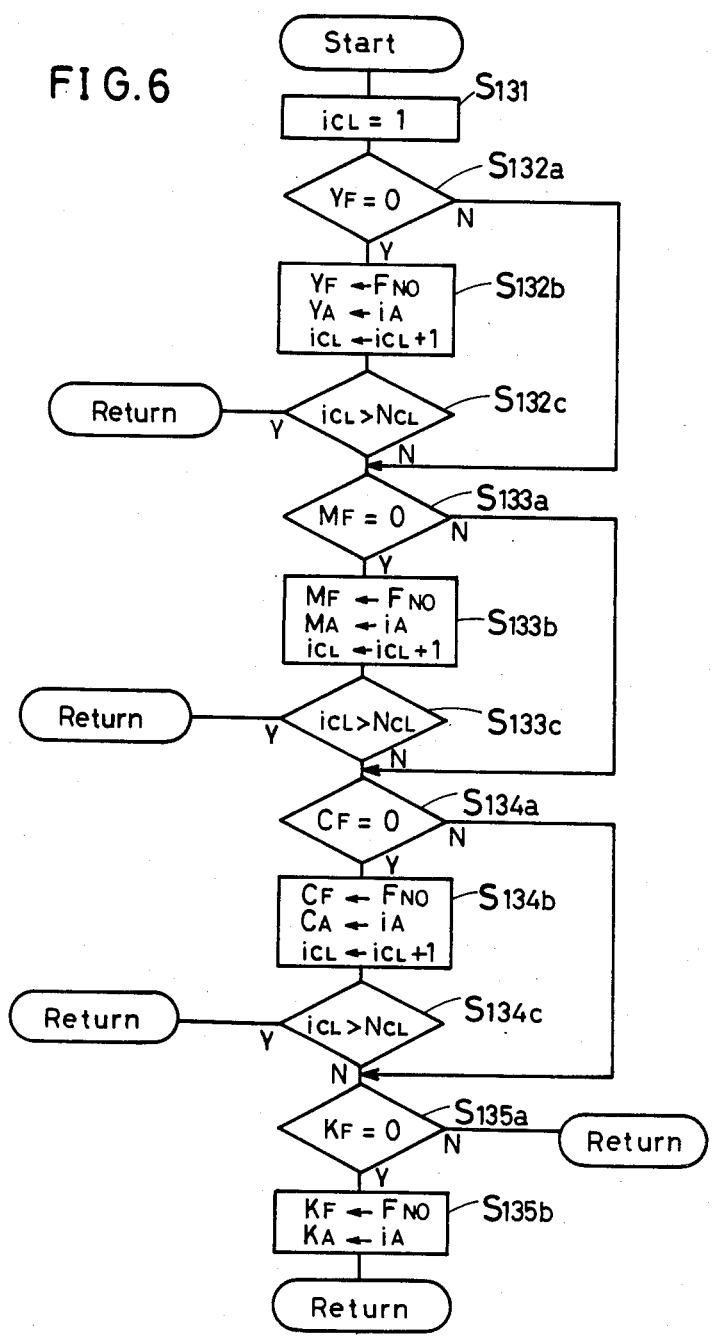
FIG. 6 shows a detailed flow chart of the color separation data processing step of FIG. 4b.

FIG. 6 shows a detailed flow chart of the color separation data processing step $S_{13}$ of FIG. 4(b), when the items 5 to 8 of Table 1 are filled with necessary data.

In FIG. 6, at first the number of the color separations $i_{CL}$ is set at step $S_{131}$ to be "1", and then it is determined at step $S_{132a}$ whether the film number $Y_F$ of the Y color separation is input. When $Y_F=0$, meaning that the Y color separation film is not allocated, at step $S_{132b}$ the number of the present film $F_{NO}$ is assigned to $Y_F$, the area number iA obtained in the step $S_{10}$ is assigned to the area number, and the color separation number $i_{CL}$ is increased by one. Then the newly determined color separation number $i_{CL}$ is compared at step $S_{132c}$ with the color separation number to be recorded in the main scanning direction $N_{CL}$ input in the step $S_7$. When $i_{CL} \leq N_{CL}$, meaning there remain other color separations to be allocated, the processes of steps $S_{133a}$ to $S_{133c}$ are carried out on an M color separation. When the result of the step $S_{132a}$ is "NO", the CPU 60 skips from step $S_{132a}$ to step $S_{133a}$ when the M color separation begins to be processed. When $i_{CL} > N_{CL}$ in the step $S_{132c}$, the data input is finished and the operation returns to the step $S_{14}$.

In the same manner, the data input processes of steps $S_{133a}$ to $S_{133c}$ for an M color separation, $S_{134a}$ to $S_{134c}$ for a C color separation, and $S_{135a}$ to $S_{135c}$ for a K color separation are carried out, however, these steps are not explained in detail herein because they are substantillaly the same as the above described steps.

When the number of color separations to be recorded in the main scanning direction is four, as shown in FIG. 3(a) (the number set up in the step $S_7$ is four), the film numbers $Y_F$, $M_F$, $C_F$ and $K_F$ all of which are "0" at steps $S_{132a}$, $S_{133a}$, $S_{134a}$ and $S_{135a}$ respectively are given the same number $F_{NO}$ and the area numbers $Y_A$, $N_A$, $C_A$ and $K_A$ are given the same number iA, obtained in the step $S_{10}$, in the respective steps $S_{132b}$, $S_{133b}$, $S_{134b}$ and $S_{135b}$. When the number of color separations to be recorded in the main scanning direction is two, as shown in FIG. 3(b) (the number set up in the step $S_7$ is two), in the step $S_{13}$ color separations Y and M are put to the processes of the steps $S_{131}$ to $S_{133b}$, then the operation of the CPU 60 proceeds via the steps $S_{133c}$, $S_{14}$ to the step $S_{15}$. Since the result of the step $S_{15}$ is "NO" in this case, the operation again proceeds to the step $S_7$. When the number $N_{ic}$ of color separations to be recorded in the main scanning direction is determined to be two, since the processes for the color separations Y and M are already completed, the results of the steps $S_{132a}$ and $S_{133a}$ become "NO". Consequently, the processes of the steps $S_{134a}$ to $S_{135b}$ are carried out on the color separations Y and M.

It should incidentally be noted that the identical film number set up in the step $S_1$ is used for the steps $S_{132b}$, $S_{133b}$, $S_{134b}$ and $S_{135b}$.

Thus the film file and the original file are filled up with the above necessary data.

Figure 7:
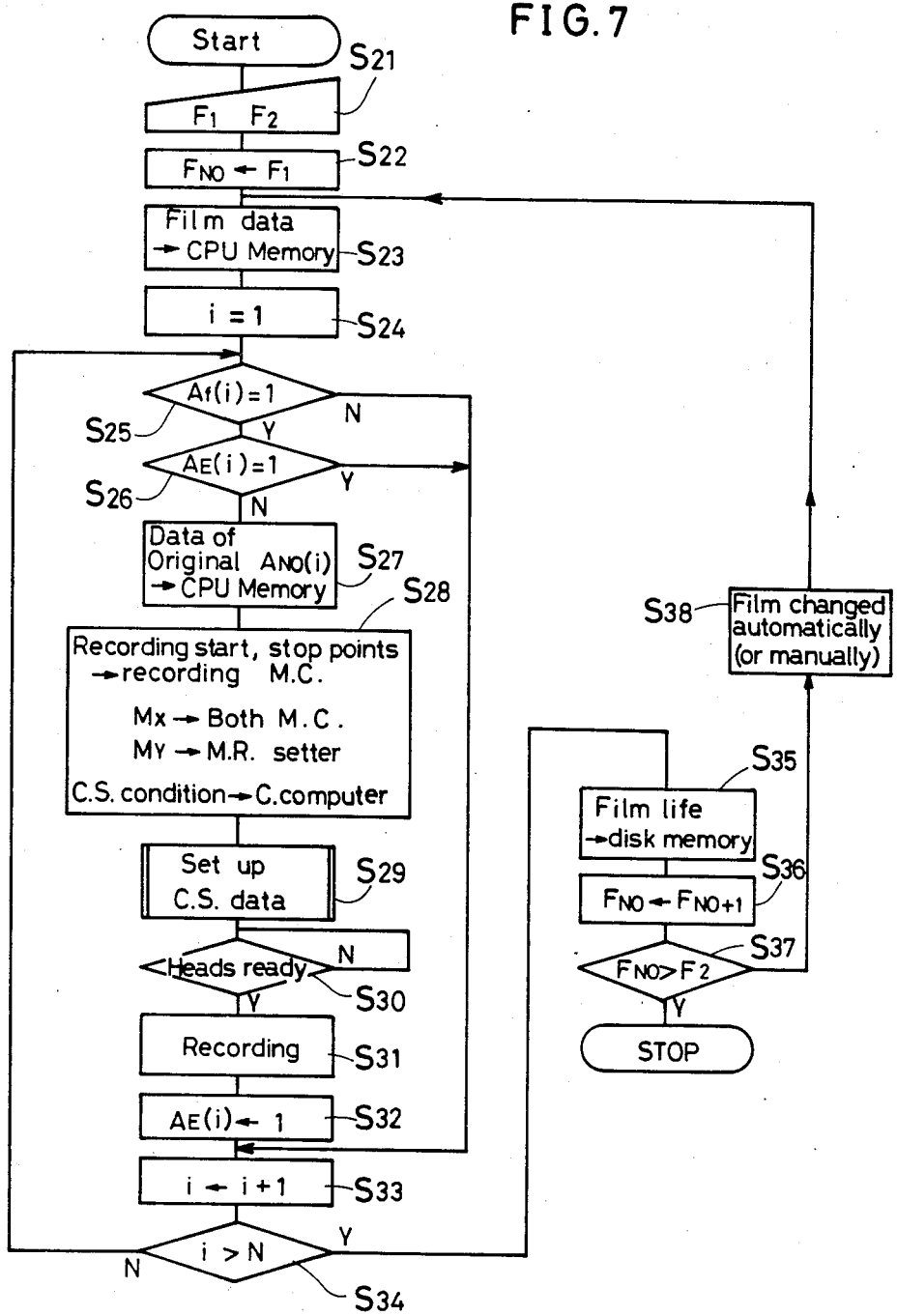
FIG. 7 shows a flow chart of the recording process of the system of FIG. 2.

FIG. 7 shows the operation of the recording controller which operates according to the above-mentioned data. At first an operator inputs from the keyboard, at step $S_{21}$ the lowest film number $F_1$ and the highest film number $F_2$ out of the numbers of a plurality of photosensitive films to which images are to be recorded. The CPU 60 sets up the lowest number $F_1$ as $F_{NO}$ at step $S_{22}$, and calls up at step $S_{23}$ a corresponding film data from the film file stored in the memory 63 to the CPU memory.

The count number i of the area counter is set at step $S_{24}$ to be 1. Then each area of the photosensitive film is successively exposed to a recording beam from Area 1. The CPU 60 determines at step $S_{25}$ whether the present area is already used (color separations of a specific original are allocated onto the film). When the present area is already used, the CPU 10 further determines at step $S_{26}$ whether the present area is already exposed. When the present area is not yet exposed, the CPU 10 reads out to the CPU memory at step $S_{27}$ necessary data for recording the present area, i.e., data of the recording start and stop points and so forth from the original file stored in the memory 63. The thus-read data of scanning start and stop points, a magnification ratio of the sub-scanning direction $M_X$, a magnification ratio of the main scanning direction $M_Y$, and color separation condition are respectively input at step $S_{28}$ to the input drum motor controller 10, the recording drum motor controller 50, the magnification ratio setter 30, and the color computer 20 as disclosed in U.S. patent application Ser. No. 630,391. In the same manner, the recording data of the corresponding area stored in the film file is set up at step $S_{29}$ to several devices as hereinafter described. Thereafter, the input head 13 and the recording head 53 are moved at step $S_{30}$ to the respective positions thereof to be ready for the image reproducing process and then put into operation at step $S_{31}$. When the recording process is complete the exposure flag $A_{E(i)}$ (in this case, i=1) is set to "1" at step $S_{32}$ to indicate the completion of the process. Then, at step $S_{33}$, the count number of the area counter is increased by 1 to be compared at step $S_{34}$ with the largest number N of the already allocated areas. When i≦N, the operation of the CPU 60 is returned to the step $S_{25}$ in order to carry out the same process for the next area (in this case, the area 2). When i>N, the operation of the CPU 60 proceeds to the subsequent steps. When the present area is not used ($A_{f(i)}=0$) or already exposed ($A_{E(i)}=1$), the area is not subjected to the steps of the process and as a result of steps $S_{25}$ and $S_{26}$ the operation of the CPU 60 proceeds directly to step $S_{33}$, where the area number is increased.

When the exposure process for the present film (in this case, the film of the lowest number) is completed, the film data called up in the step $S_{23}$ and edited in the step $S_{32}$ is saved at step $S_{35}$ into the film file of the memory 63, while the count number of the counter is increased at step $S_{36}$ by 1 and the film number $F_{NO}$ thereof is compared at step $S_{37}$ with the highest film number $F_2$. When $F_{NO} \leq F_2$, since other unprocessed films remain, the photosensitive film mounted on the recording drum is automatically or manually replaced at step $s_{38}$ by the film corresponding to the number obtained in the step $S_{36}$ (in this case, the number is 2), and operation is returned to the step $S_{23}$. This routine, from the step $S_{23}$ to $S_{36}$ is repeated until the numbers $F_{NO}$ and $F_2$ come to have a relation of $F_{NO} > F_2$ in the step $S_{37}$, when all the films are recorded with color separations.

Figure 8:
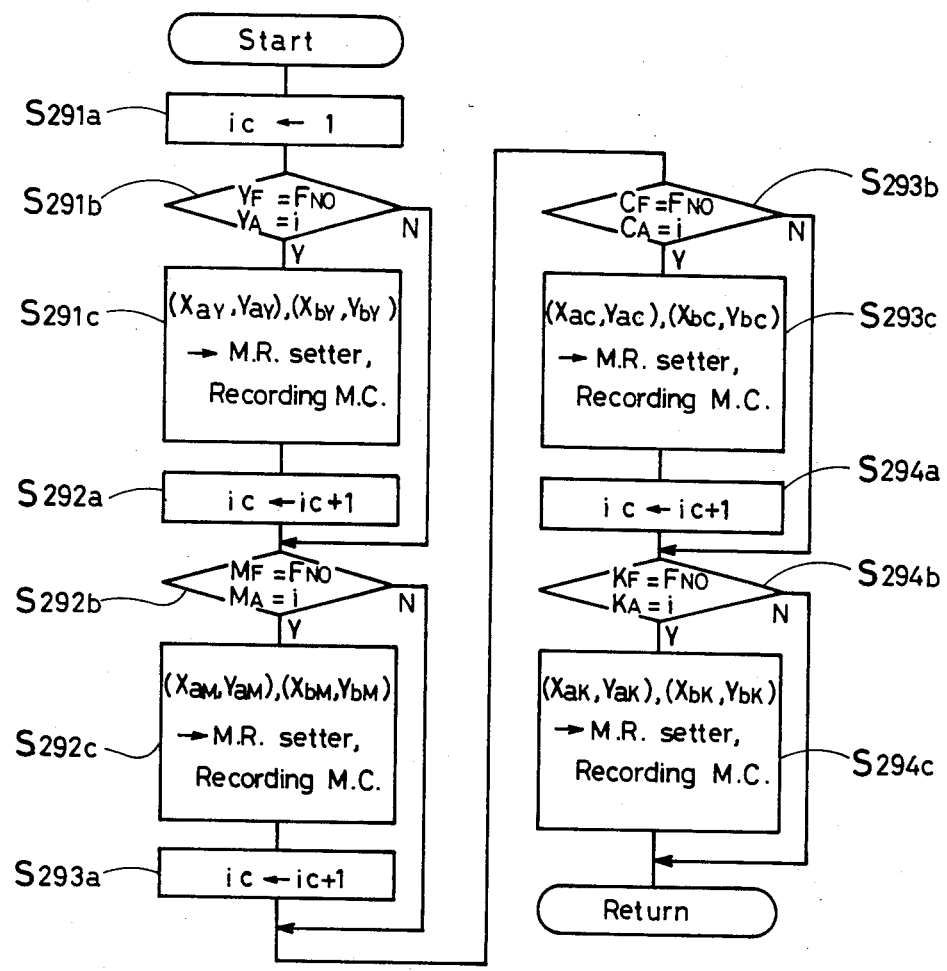
FIG. 8 shows a detailed flow chart of the color separation data setup process of FIG. 7.
Figure 9:
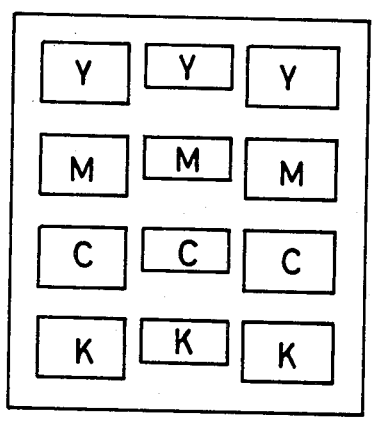
FIGS. 9a, 9b show a conventional arrangement examples of color separation images.
Figure 9:
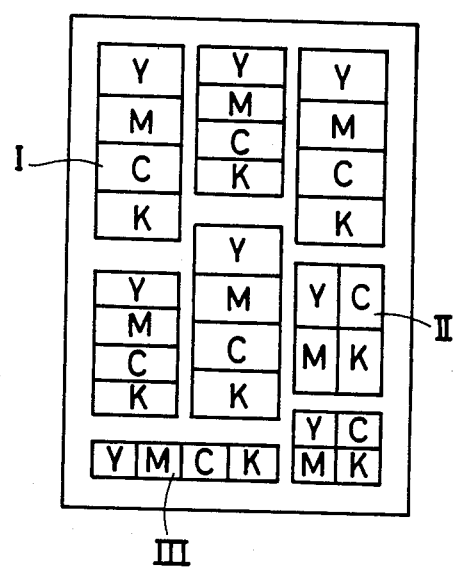

FIG. 8 shows a detailed flow chart of the color separation data setup step $S_{29}$.

At first the count number ic of the color separation counter is set at step $S_{291a}$ to 1. It is then determined at step $S_{291b}$ whether the first color separation (in this case, the Y color separation image) is to be exposed. Precisely, it is judged whether the film number $F_{NO}$ given in the step $S_{22}$ or the step $S_{36}$ is identical to the film number $Y_F$ of the Y color separation stored in the original file, and it is further judged whether the area number i given in the step $S_{24}$ or in the step $S_{33}$ is identical to the area number $Y_A$ of the Y color separation stored in the original file. When $Y_F = F_{NO}$ and $Y_A = i$, the Y color separation must be recorded. Therefore subsequently the coordinate value $(X_{aY}, Y_{aY})$ of the recording start point and the coordinate value $(X_{bY}, Y_{bY})$ of the recording stop point are set up at step $S_{291c}$ to the magnification ratio setter 30 and the recording ratio drum motor controller 50. Then the count number of the color separation counter is increased by 1 at step $S_{292a}$, and the next color separation M is processed in accordance with steps $S_{292b}$ and $S_{292c}$, which are the same as the steps $S_{291b}$ and $S_{291c}$. The same processes are carried out on the C and K color separations respectively in steps $S_{293a}$ to $S_{293c}$ and $S_{294a}$ to $S_{294c}$. When any of the four color separation images are judged not to be exposed in the respective steps $S_{291b}$, $S_{292b}$, $S_{293b}$ and $S_{294b}$, the operation of the CPU 60 skips the subsequent data setup steps of the color separation. It is noted that when the process for the K color separation must be skipped, the operation proceeds to the next step $S_{30}$.

It should be noted that the coordinate values $(X_{a\alpha}, Y_{a\alpha})$ of the recording start point and that $(X_{b\alpha}, Y_{b\alpha})$ of the recording stop point, where $\alpha$ is Y, M, C, or K, are:

$X_{a\alpha} = A_{Xa(i)}$,
$Y_{a\alpha} = A_{Ya(i)} + (ic-1)(S_Y + D_y)$,
$X_{b\alpha} = A_{Xb(i)}$, and
$Y_{b\alpha} = Y_{a\alpha} + S_Y$ As mentioned above, since the present invention is capable of determining ideal recording start and stop points in response to an operator's input of only an approximate recording start point for each recording area, in determining the ideal points by means of a CRT display monitor, an operator is merely required to establish an approximate recording start point in designating each recording area, which procedure is much simpler than any conventional image allocation method. In addition to avoiding overlapped image allocation, the automatic allocation process according to the invention advantageously makes efficient use of a photosensitive film and reduces wasteful gaps between areas allocated thereto.

TABLE 1

| (1) Original No. | | |
|---|---|---|
| (2) Input scanning | Start point | $x_a y_a$ |
|  | Stop point | $x_b y_b$ |
| (3) Magnification ratio |  | $M_X M_Y$ |
| (4) Output size |  | $S_X S_Y$ |
| (5) Y color | Film No. | $Y_F$ |

TABLE 1-continued

| | separation | Area No. | $Y_A$ |
|---|---|---|---|
| (6) | M color separation | Film No. Area No. | $M_F$ $M_A$ |
| (7) | C color separation | Film No. Area No. | $C_F$ $C_A$ |
| (8) | K color separation | Film No. Area No. | $K_F$ $K_A$ |
| (9) | Color separation data | | |

TABLE 2

| (1) Film No. | $F_{No}$ |
|---|---|
| (2) Film size | $F_x$ $F_y$ |
| (3) Area data | |
| Area 1 | $A_{E(1)}, A_{f(1)}, A_{No(1)}, A_{c(1)}, A_{Xa(1)},$ $A_{Ya(1)}, A_{Xb(1)}, A_{Yb(1)},$ |
| Area 2 | $A_{E(2)}, A_{f(2)}, A_{No(2)}, A_{c(2)}, A_{Xa(2)},$ $A_{Ya(2)}, A_{Xb(2)}, A_{Yb(2)},$ |
| . | . |
| Area i | $A_{E(i)}, A_{f(i)}, A_{No(i)}, A_{c(i)}, A_{Xa(i)},$ $A_{Ya(i)}, A_{Xb(i)}, A_{Yb(i)},$ |
| . | . |
| Area N | $A_{E(N)}, A_{f(N)}, A_{No(N)}, A_{c(N)}, A_{Xa(N)},$ $A_{Ya(N)}, A_{Xb(N)}, A_{Yb(N)},$ |

I claim:

1. In an image reproduction process, a method for allocating areas corresponding to color separation images of originals onto a photosensitive film comprising the steps of:
   (a) displaying an allocation state of previously allocated areas of a photosensitive film on a display monitor;
   (b) establishing an approximate recording start point of an area to be allocated onto a desired position of the photosensitive film in due consideration of the displayed image;
   (c) setting a conclusive recording start point at predetermined distances from the recording stop points of previously allocated areas in main and sub scanning directions according to the established approximate recording start point;
   (d) allocating an area of the photosensitive film to the image according to the conclusive recording start point data thereof; and
   (e) displaying the new allocation state of the photosensitive film.

2. A method as recited in claim 1 in which the step (c) comprises the steps of:
   (i) determining with regard to every previously allocated area whether the sub-scanning direction value of the approximate recording start point is greater than that of the recording start point of each such allocated area and whether the main scanning direction value of the approximate recording start point is between the main scanning direction values of the recording start and stop points of the same area, and selecting a previously allocated area which is determined to satisfy each of the foregoing determinations and to have the largest sub-scanning direction value of recording start point;
   (ii) obtaining the sub-scanning direction value of the conclusive recording start point by summing up the sub-scanning direction value of the recording stop point of the area selected in the step (i) and a coordinate value corresponding to a gap width of the same direction;
   (iii) determining with regard to every previously allocated area whether the main scanning direction value of the approximate scanning start point is greater than that of the recording start point of each area, whether the sub-scanning direction value obtained in the step (ii) is not greater than the sub-scanning direction value of the recording stop point of the previously allocated area, and whether the sub-scanning direction value of a point obtained by summing the sub-scanning direction value obtained in the step (ii) and a coordinate value corresponding to the length of the area to be allocated is not smaller than the sub-scanning direction value of the recording start point of the previously allocated area; and selecting a previously allocated area which is determined to satisfy each of the foregoing determinations; and
   (iv) obtaining the main scanning direction value of the conclusive recording start point by summing the main scanning direction value of the recording stop point of the area selected in the step (iii) and a coordinate value corresponding to the gap width of the same direction.

3. A method as recited in claim 2 comprising the further step of recording the color separation images on the areas allocated thereto on the photosensitive films.

4. A method as recited in claim 2 wherein at least one of said steps (i) and (iii) includes in the step of selecting a previously allocated area, in addition to said step of selecting an area determined to satisfy each of the determinations, the further step of selecting an area having a recording start point in the corresponding respective sub-scanning or main-scanning direction having the maximum value of all the corresponding respective recording start points of the allocated areas in the corresponding respective sub-scanning or main scanning direction.

5. A method as recited in claim 1 comprising the further step of recording the color separation images on the areas allocated thereto on the photosensitive films.

6. A method for allocating images onto a photosensitive film comprising the steps of:
   (a) displaying an allocation state of previously recorded areas of a photosensitive film on a display monitor according to a corresponding film file storing data specifying the allocation state of areas of the photosensitive film;
   (b) designating a number of an original image for which reproduction images are not yet allocated in accordance with a corresponding original file specifying allocation states of areas corresponding to the images on respective areas of the photosensitive film;
   (c) designating a number of sequential color separation images to be allocated sequentially in a main scanning direction of the original designated in step (b);
   (d) establishing, in accordance with the allocation state displayed at step (a), an approximate recording start point for each area corresponding to color separation images to be allocated onto a desired area of the photosensitive film;
   (e) obtaining a conclusive recording start point at predetermined distances from the recording stop points of previously allocated areas in the main and sub-scanning directions according to the established approximate recording start point;
(f) determining whether the entire area to be allocated according to the conclusive tart point obtained at step (e) is within the photosensitive film;
(g) when the entire area allocated according to the conclusive recording start point is not entirely within the photosensitive film and protrudes therefrom, returning to step (d) for further processing and when the entire allocated area is within the photosensitive film continuing with step (h);
(h) storing data descriptive of the allocated area into the film file;
(i) storing data descriptive of the allocated area corresponding to the color separation images of an original image designated in step (b) into the original file;
(j) renewing the display image ont he display monitor according to the film file obtained in step (h);
(k) determining whether any color separation images, original images, or films remain to be allocated; and
(l) returning the recording area allocation operation to step (c) when unprocessed color separation images remain to be allocated, to step (b) when unprocessed original images remain to be allocated, or to step (a) when unprocessed films remain to be allocated.

7. A method as recited in claim 6 comprising the further step of recording the color separation images on the areas allocated thereto on the photosensitive films.

8. An apparatus for allocating areas corresponding to color separation images of originals onto a photosensitive film in reproducing images comprising:
(a) a display means for displaying an allocation state corresponding to data entered in a corresponding film file, data obtained from an approximate recording start point establishing means, and data obtained from a processor;
(b) an input means for data;
(c) a first memory means for storing film files, each of which stores data descriptive of the allocation state of a photosensitive film corresponding to a film number input from the input means;
(d) a second memory means for storing original files, each of which stores data descriptive of the allocation state of areas corresponding to color separations of an original image number input from the input means;
(e) an approximate recording start point establishing means for establishing an approximate recording start point of an area to be allocated onto a desired position of the photosensitive film in due consideration of the displayed image according to the data entered in the film file;
(f) a conclusive recording start point computation means for computing and obtaining a conclusive recording start point at predetermined distances from the recording stop points of previously allocated areas in main and sub-scanning directions according to the established approximate recording start point;
(g) a first determining means for determining whether the area to be allocated according to the conclusive recording start point obtained by the computation means is within the photosensitive film;
(h) a first entering means for entering data descriptive of the newly allocated area into a corresponding film file;
(i) a second entering means for entering the data descriptive of the newly allocated area into a corresponding original file; and
(j) a means for checking for existence of unprocessed color separation images, original images and films.

9. An apparatus claimed in claim 8 in which the computation means comprises:
(i) a second determining means for determining with regard to each previously recorded area whether the sub-scanning direction value of the approximate recording start point is greater than that of the recording start point of each such area, and whether the main scanning direction value of the approximate recording start point is between the main scanning direction values of the recording start and stop points of the same area;
(ii) a first selecting means for selecting a previously recorded area which is determined by said second determining means to satisfy each of the determinations thereof;
(iii) a first obtaining means for obtaining the sub-scanning direction values of the conclusive recording start point by summing up the sub-scanning direction value of the recording stop point of the selected area and a coordinate value corresponding to a gap width of the same direction;
(iv) a third determining means for determining with regard to every previously recorded area whether the main scanning direction value of the approximate scanning start point is greater than that of the recording start point of each area, whether the sub-scanning direction value is smaller than the sub-scanning direction value of the recording stop point of the previously recorded area and whether the sub-scanning direction value of a point obtained by summing the sub-scanning direction value and a coordinate value corresponding to the length of the area to be allocated is greater than the sub-scanning direction value of the recording start point of the same previously recorded area;
(v) a second selecting means for selecting a previously recorded area which is determined by said third determining means to satisfy each of the criteria thereof; and
(vi) a second obtaining means for obtaining the main scanning direction value of the conclusive recording start point by summing the main scanning direction value of the recording stop point of the area selected by said second selecting means and a coodinate value corresponding to the gap width of the same direction.

* * * * *